United States Patent Office 3,089,875
Patented May 14, 1963

---

3,089,875
ALKYL, ARYL SUBSTITUTED MELEMS
Hansjuergen A. Schroeder, New Haven, Conn., assignor to Olin Mathieson Chemical Corporation, a corporation of Virginia
No Drawing. Filed Feb. 23, 1961, Ser. No. 90,970
2 Claims. (Cl. 260—249.6)

This invention relates to melem derivatives and to a method for their preparation. More particularly, this invention relates to N-diaryl-N',N''-tetraalkyl(or dialkyl)-melems. The novel compounds of this invention have the formula:

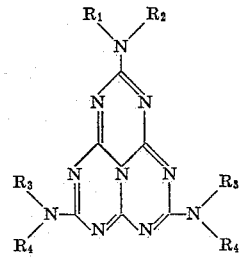

wherein $R_1$ and $R_2$ are selected from a group consisting of phenyl, tolyl, xylyl, naphthyl, methylnaphthyl, biphenyl, and methylbiphenyl radicals, $R_3$ is an alkyl radical having 4 to 12 carbon atoms, and $R_4$ is hydrogen or an alkyl radical having from 4 to 12 carbon atoms.

While melem (triamino-cyamelurine) has been described in the literature, none of its derivatives have ever been prepared. Compounds containing the cyamelurine nucleus ($C_6H_7$) have been known since 1835. In 1937 L. Pauling and J. H. Sturdivant (Proc. Natl. Acad. Sci., 23, 615 (1937)), established the structure of a coplanar arrangement of three fused s-triazine rings. In 1940 Redeman and Lucas (JACS 62, 842 (1940)) were successful in preparing the compound cyameluric chloride. Although melem is insoluble in organic solvents, it has been found that the novel melem derivatives prepared by the process of this invention are soluble in organic solvents, such as benzene, acetone, carbon tetrachloride and nitromethane.

The novel compounds are prepared by reacting a cyameluric halide successively with a secondary aryl amine and a mono or dialkyl amine. The reaction is carried out in the presence of an inert organic solvent which can be benzene, toluene, or xylene, etc. During the addition of the diaryl amine the reaction temperature is maintained at from about 20° C. to about 80° C. and preferably at about 30° C. to about 60° C., while during the addition of the mono or dialkyl amine the reaction temperature is maintained at from about 20° C. to about 140° C. with the preferred temperature being from about 30° C. to 90° C. In the first phase of the reaction the diaryl amine is reacted with the cyameluric chloride in a mole ratio of 2 to 1. One half of the diaryl amine charged to the reactor serves as an accepter for the hydrogen chloride formed during the first phase of the reaction and thus prevents undesirable side reactions from developing. In the second phase of the reaction at least 4 moles of the mono or dialkyl amine are employed per mole of cyameluric chloride charged to the reactor and, as in the first phase, the excess of amine supplied serves as an accepter for the hydrogen chloride formed during the second phase. The reaction time generally will be from about 1 to about 4 hours.

Secondary aryl amines useful in the process of this invention include diphenyl amine, ditolyl amine, dixylyl amine, dinaphthyl amine, di(methylnaphthyl)amine and bis(diphenyl)amine, etc. Alkyl amines and dialkyl amines suitable as starting materials include n-butylamine, di-n-butylamine, isoamylamine, di-isoamylamine, di-n-hexylamine, heptylamine, di-n-heptylamine, di-n-nonylamine, etc. Suitable cyameluric halides include cyameluric chloride, and the corresponding fluoride, bromide and iodide derivatives.

The novel compounds of this invention have a pronounced gelatinizing effect upon aliphatic hydrocarbons, the principal constituents of commercial gasoline. The gels so produced are long lasting. They are superior in many properties, such as gelling power, over the conventional materials being used for this purpose at this time.

In preparing the gel compositions, the melem derivatives of this invention are simply mixed with an aliphatic hydrocarbon such as Skellysolve C (B.P. 88°–90° C.), ligroin. n-heptane, etc. and heated to the boiling point to effect solution after which the mixture is allowed to cool to room temperature. Gelling takes place within 1 to 5 hours. In general, the amount of melem derivative needed to prepare a satisfactory gel is from 0.5 to 1 percent by weight of the aliphatic hydrocarbon. Gels formed in the manner described are stiff and show little change after standing air-sealed for six months or more. If the shape of the gel is intentionally destroyed, for example, with a spatula, it can be restored easily by heating the mixture until complete solution is effected. The novel melem derivatives of this invention exhibit exceptional thermal stability. Hydrocarbon gels containing the novel melem derivatives are prevented from undergoing rapid thermal decomposition because of the high degree of thermal stability of these melem materials and consequently gels possess sustained burning properties. Since these gel compositions do possess sustained burning properties they are especially useful as fuels for flame thrower. A comparison of the burning times of equal amounts of gel and untreated hydrocarbon showed that the novel gels burn approximately ten times as long as the hydrocarbon alone. The novel gelling agents are not sensitive to humid air and, therefore, can be stored without special precautions, whereas the aluminum alkoxides hydrolyze easily. The novel melem derivatives of this invention form gels with the aliphatic hydrocarbons in the unusually low concentration of from about 0.5 to 1 percent by weight of the hydrocarbon while in the case of the aluminum soap gels approximately 4 to 5 percent by weight of the thickener is required. Whereas the aluminum soap gels and synthetic rubber gels segregate within several hours, the gels formed in the manner previously described with the novel melem derivatives of this invention are stable for six months or longer.

The gel compositions prepared using the novel melem derivatives of this invention are also useful in the cleaning of textiles as laundry spotting agents. The low concentration of the gelling agent is advantageous for this purpose, and furthermore, because of their chemical inertness, these gelling agents have no deleterious effect on the textiles. Such gel compositions can be conveniently packed for laundry spotting in squeeze tubes.

The following examples further illustrate this invention.

EXAMPLE I

(A) Cyameluric Chloride

A mixture of 25 grams of anhydrous potassium cyamelurate ($C_6N_7O_3K_3$) prepared according to the method of Redeman and Lucas, JACS 61, 3420 (1939) and 60 grams of phosphorous pentachloride was heated in a sealed tube at 230° C. for 12 hours. No pressure was observed when the tube was opened at room temperature. The reaction product thus obtained was added, with stirring, to cold water maintained at a temperature below 10° C. The insoluble cyameluric chloride which was recovered from the water mixture by filtration on a suction filter was dried over phosphorous pentoxide in vacuo to yield 19.0 grams of cyameluric chloride (92 percent of the theoretical quantity).

The product was analyzed and found to contain 38.42 percent chlorine as compared to a calculated value of 38.47.

(B) *N-Diphenyl-N',N"-Tetraheptylmelem*

A total of 17 grams of diphenylamine (0.1 mole) dissolved in 120 milliliters of benzene was added at 20° C., with stirring, to a suspension of cyameluric chloride (14 grams, 0.05 mole) in 110 milliliters of benzene. This mixture was maintained at 65° C. for one hour. After the mixture had been cooled to 25° C., 42.6 grams of di-n-heptylamine (0.2 mole) dissolved in 80 milliliters of benzene was added and the mixture was refluxed for 30 minutes. Then the reaction mixture was cooled and filtered. The filtrate was evaporated and the residue extracted with 400 milliliters of ligroin (B.P. 65°–110° C.) to remove soluble impurities. The crude product remaining (22 grams) was recrystallized from ethanol to give 18.9 grams of N-diphenyl-N',N"-tetraheptylmelem (49.2 percent of the theoretical yield) having a melting point of 160°–162° C.

Analysis of the N-diphenyl-N',N"-tetraheptylmelem gave the following results:

|  | C | H | N |
|---|---|---|---|
| Calculated for $C_{46}H_{76}N_{10}$ | 72.40 | 9.25 | 18.36 |
| Found | 73.43 | 7.59 | [1] 18.17 |

[1] Average value of two determinations.

EXAMPLE II

*N-Diphenyl-N',N"-Tetraheptylmelem*

A total of 10.2 grams of diphenylamine (0.06 mole) dissolved in 50 milliliters of toluene was added to a suspension of cyameluric chloride in 50 milliliters of toluene. Preparation of the cyameluric chloride was accomplished in the same manner as described in Example I. The mixture was then heated, with stirring, for one hour at 70° C. The mixture was cooled to 20° C. and 25.6 grams of di-n-heptylamine (0.12 mole) in 50 milliliters of toluene was added after which the mixture was refluxed for one hour. Then the reaction mixture was cooled and filtered. The filtrate was evaporated to dryness and the residue was recrystallized from ethanol to yield 11.5 grams of N-diphenyl-N',N"-tetraheptylmelem (50.3 percent of the theoretical quantity).

EXAMPLE III

An amount of 1 gram of N-diphenyl-N',N"-tetraheptylmelem and 100 milliliters of Skellysolve C (B.P. 88°–98° C.) were heated together to 60° C. to effect solution of the melem in the Skellysolve C and then allowed to cool to room temperature. A stiff, white, nontransparent gel formed within one hour.

EXAMPLE IV

One gram of N-diphenyl-N',N"-tetraheptylmelem was dissolved in 210 milliliters of Skellysolve C (B.P. 88°–98° C.) at 60° C. and the solution was allowed to cool to room temperature. The stiff gel thus formed was almost completely unchanged after standing air-sealed for six months.

EXAMPLE V

One gram of N-diphenyl-N',N"-tetraheptylmelem was mixed with 100 milliliters of ligroin (B.P. 65°–110° C.) and heated to reflux to effect solution of the melem in the ligroin. The gel composition thus obtained showed no segregation after being stored air-sealed for three months.

EXAMPLE VI

One gram of N-diphenyl-N',N"-tetraheptylmelem and 100 milliliters of n-heptane (B.P. 98° C.) were heated to reflux and the solution was allowed to cool to room temperature. A stiff gel equal in appearance to the products of Examples III, IV and V was obtained. Intentional destruction of the shape of the gel with a spatula liquified a small part of the product. Upon reheating of the sample to reflux temperature for three minutes, complete solution was effected and, after cooling the gel was restored to its previous form.

EXAMPLE VII

The gel composition produced in Example V was subjected to a burning test. When six grams of this ligroin gel which had been aged three months was burned on a stone slab a burning time of 2 minutes and 40 seconds was observed. It was also noted that the gel did not liquefy on burning. Six grams of ligroin alone tested in the same manner burned completely in 20 seconds.

What is claimed is:
1. A compound of the formula:

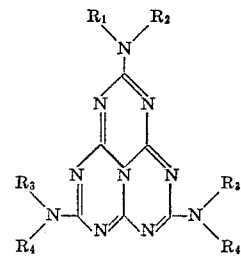

wherein $R_1$ and $R_2$ are selected from the group consisting of phenyl, tolyl, xylyl, naphthyl, methylnaphthyl, biphenyl, and methylbiphenyl, $R_3$ is an alkyl group having 4 to 12 carbon atoms and $R_4$ is selected from the group consisting of hydrogen and an alkyl group having 4 to 12 carbon atoms.

2. N-diphenyl-N',N"-tetraheptylmelem.

References Cited in the file of this patent

Redemann et al.: Journal of the American Chemical Society, Volume 62, pages 842–846 (1940).

Somlin et al.: "s-Triazines and Derivatives", Inter-Science Publishers Inc., New York (1959), pages 315, 351 and 466.